Jan. 22, 1963   H. F. KENNEL   3,074,682
TORQUE COMPENSATION DEVICE
Filed Aug. 11, 1961   4 Sheets-Sheet 1
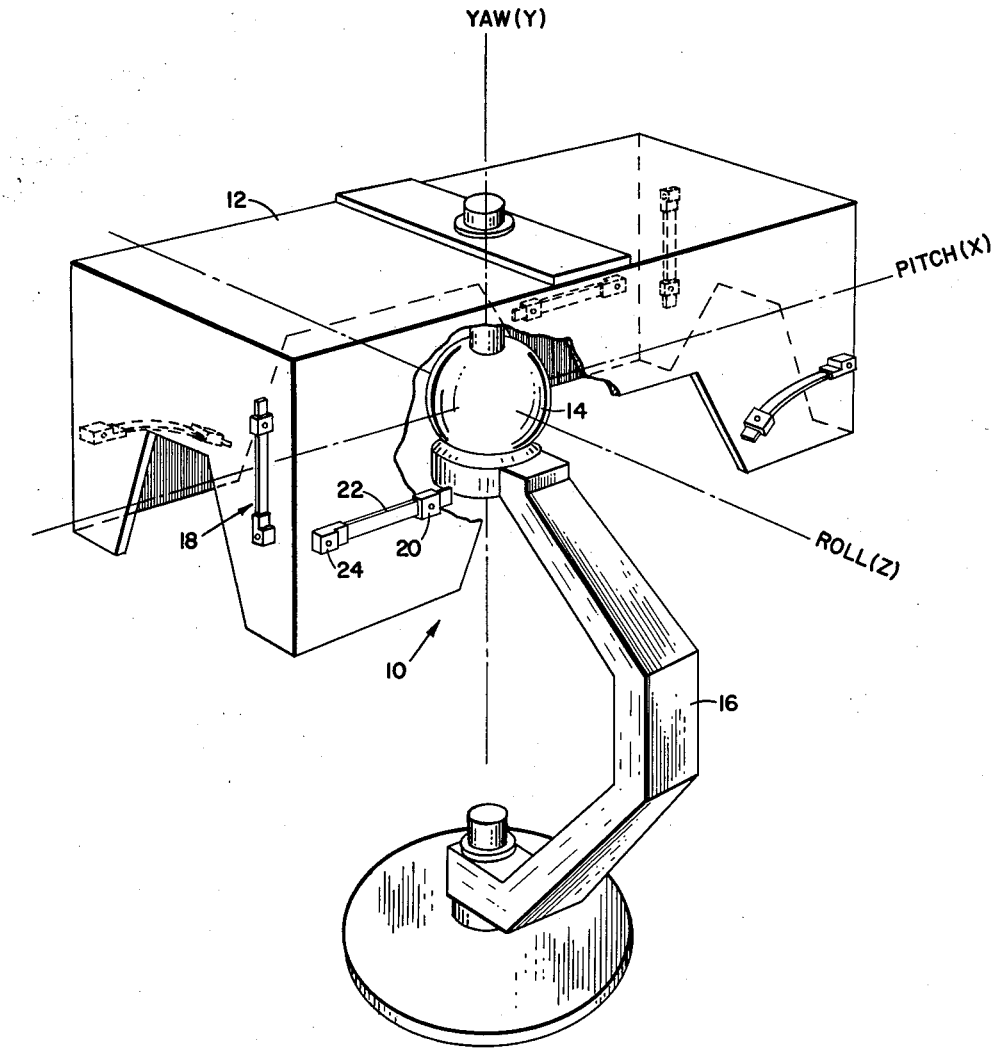
FIG. I
Hans F. Kennel,
*INVENTOR.*
BY S. J. Rotondi
A. P. Dupont
Leonard Flack
ATTORNEYS.

Jan. 22, 1963　　　H. F. KENNEL　　　3,074,682
TORQUE COMPENSATION DEVICE
Filed Aug. 11, 1961　　　　　　　　　　　　　4 Sheets-Sheet 2

Hans F. Kennel,
*INVENTOR.*

BY

ATTORNEYS.

Jan. 22, 1963 H. F. KENNEL 3,074,682
TORQUE COMPENSATION DEVICE
Filed Aug. 11, 1961 4 Sheets-Sheet 3

Hans F. Kennel,
INVENTOR.

BY
ATTORNEYS.

Hans F. Kennel,
INVENTOR.

BY

ATTORNEYS.

3,074,682
TORQUE COMPENSATION DEVICE
Hans F. Kennel, Huntsville, Ala., assignor to the United States of America as represented by the Secretary of the Army
Filed Aug. 11, 1961, Ser. No. 131,026
4 Claims. (Cl. 248—415)
(Granted under Title 35, U.S. Code (1952), sec. 266)

The invention described herein may be manufactured and used by or for the Government for governmental purposes without the payment of any royalty thereon.

This invention pertains to a device to produce a torque equal in magnitude but opposite in sign to a disturbance torque imposed on an object. More particularly the invention herein described pertains to an anisoelastic torque compensation device for use in satellite motion simulators.

Testing of attitude control (control of its position in space) for space vehicles and satellites requires simulation of important actual flight conditions. To meet this requirement a satellite motion simulator has been developed to provide frictionless suspension of a body. The simulator is comprised of a base, a support arm secured thereto, an air bearing disposed on one end of the support arm and a platform mounted on the air bearing. The platform is designed to receive missile and rocket control components thereon to be subjected to the simulation of actual flight conditions for the checkout and development of the components.

The platform is loaded with the particular control instruments to be tested. It is then balanced about its three mutually perpendicular and intersecting axes.

The platform and components carried thereby are tilted and stabilized at a desired angle with relation to one or more of the axes.

The tilt angle of the platform is then ascertained and noted. The components being tested are then energized and they in turn generate an attitude correcting signal to actuate the control devices of the platform (not shown). Control devices may be flywheel masses, or momentum storage devices where change in the speed of the rotary masses provides for a reaction of the platform either to maintain a continuous attitude or to obtain a different attitude. The effect of maintaining or varying the attitude of the platform is due to the mutual reactions of the platform and rotary masses, as one turns relative to another, within their overall gyroscopic assembly.

Alternatively, or in addition to the above mentioned control devices an expulsion device (usually of the jet type) may be used for attitude control of the platform. Responsive to the actuation of the control devices the platform is made to move to the desired or programmed attitude. Therefore the effectiveness and speed of correction of the attitude correcting devices may be studied from data obtained by the use of the simulator platform.

Quite obviously, to effectively perform its task, a platform is required to have almost unrestricted angular freedom of motion about its three mutually perpendicular and intersecting axes, frictionless suspension and neutral equilibrium at any deflection angle.

The intended use of the simulator makes it necessary that, after the initial setting has been imparted thereto, the torques introduced from the outside into the system be negligible. These torques would be due to friction about bearing surfaces and unbalance inherent in the platform. The requirement for minimizing torques imparted to the platform as a result of friction necessarily led to the use of spherical air bearings as the only satisfactory solution for the bearing support of a platform.

Since every control component attached to the platform for testing changes the characteristics of the unbalance, an easily adaptable solution to overcome this problem of unbalance had to be found.

One solution to the problem seemed to be to provide a compensation torque to counteract the torques imposed on the platform. A torque compensation device to accomplish this result was then developed. This device consists of a slidable mass on a cantilevered leaf spring. The spring-mass device was designed to produce a compensation torque sufficient to counterbalance torques imposed on a test platform as a result of unbalance. The devices are mounted in pairs on the platform, each pair being parallel to one of the intersecting perpendicular axes of the platform.

It is therefore an object of the present invention to provide a device to produce a torque to compensate for torques imposed on an object.

A further object of the present invention is to provide a device to produce a torque equal in magnitude, but opposite in sign, to a disturbance torque imparted to an object as a result of unbalance.

A still further object of the present invention is to provide a device to produce a compensation torque of variable amplitude.

The foregoing and other objects will become more fully apparent from the following detailed description of structure embodying the invention and from the accompanying drawngs, in which:

FIGURE 1 is a partially cut-away elevational view of a satellite motion simulator showing the torque compensation devices mounted thereon.

Figure 2B:
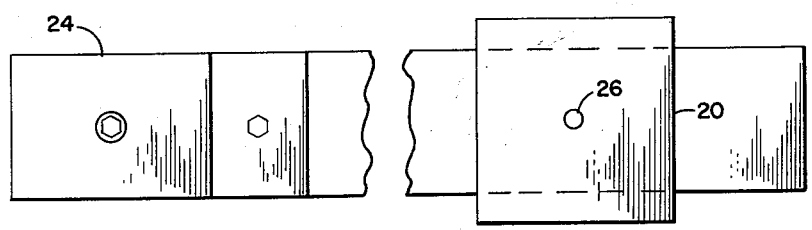
FIGURE 2b is a plan view of the torque compensation device.

In FIGURE 1 the simulator 10 which includes platform 12 is shown mounted on an air bearing 14 which is in turn mounted on a pedestal 16. The instrument-supporting platform 12 is disposed to receive thereon a missile or rocket component which is to be subjected to conditions which the component will encounter in actual flight.

To keep unbalances to a minimum the platform must be "isoelastic," i.e., the center of gravity of the platform 12 and mounted equipment must remain on the perpendicular through the center of rotation at any arbitrary deflection angle of the platform.

If the center of gravity of the platform were to shift (even 0.1 inch-ounce) as a result of unequal deflection of the platform the control torque (the torque required to return the platform to the desired attitude) would be exceeded. However, if the disturbance moment resulting from this unequal deflection is known for every angular position of the platform, an unbalance torque curve (FIGURE 5) can be plotted.

By proper orientation of the compensation devices relative to the axes of the platform and by proper location of the mass on the flat spring of the devices the unbalance torque could be counteracted and a second torque curve could be plotted which precisely matches the unbalance torque curve. Therefore, by knowing the disturbance moment for every angular position of the platform and by knowing the amount of torque required to compensate for the disturbance moment, the net moment at any angular position of the platform would be made to approach zero.

Figure 5:
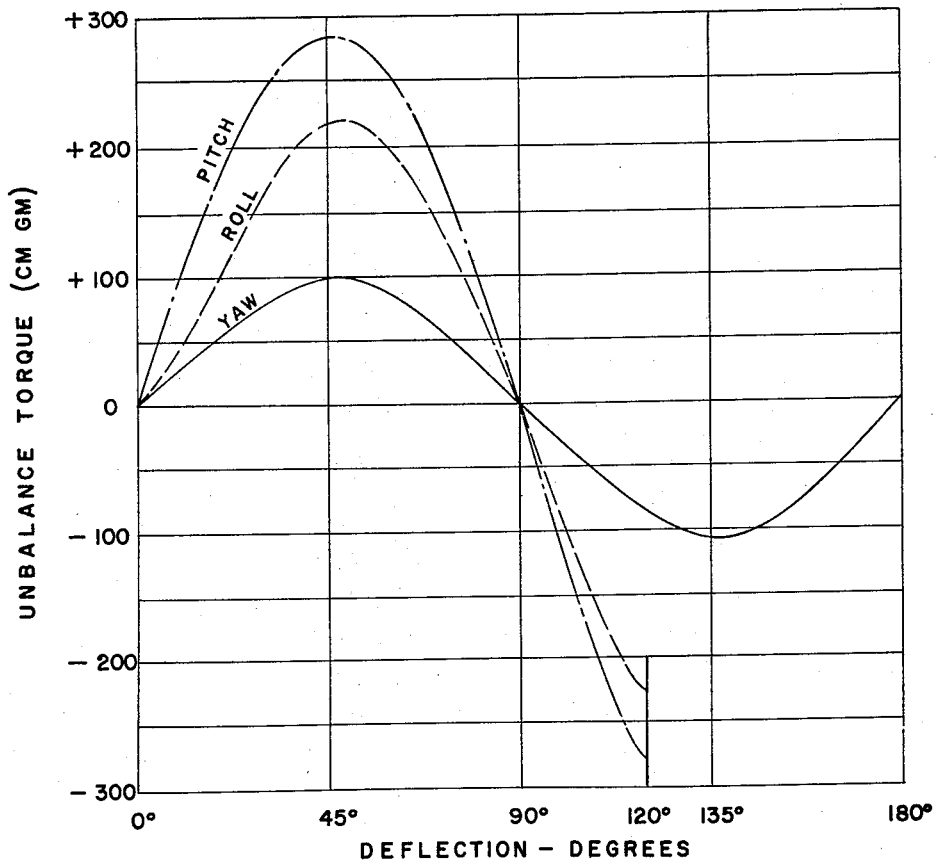
FIGURE 5 is a graph illustrating the effect of an unbalance torque imposed on a platform.

As shown in FIGURE 1 a pair of compensation devices 18 are provided for each of the three mutually perpendicular intersecting axes, also called the yaw, pitch and roll axes of the simulator, and provide all of the desired features for easy change of magnitude of the compensation torque curve shown in FIGURE 5.

Figure 2A:
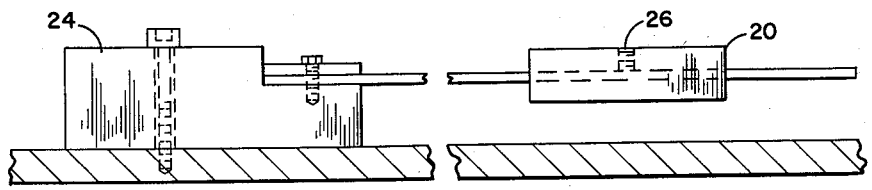
FIGURE 2a is an elevation view of the torque compensation device.
Figure 3:
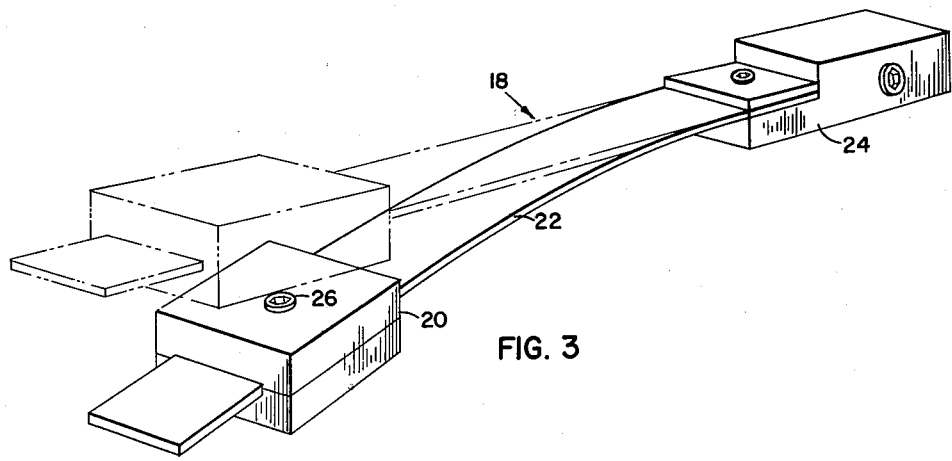
FIGURE 3 is a pictorial view of the torque compensation device.
Figure 4A:
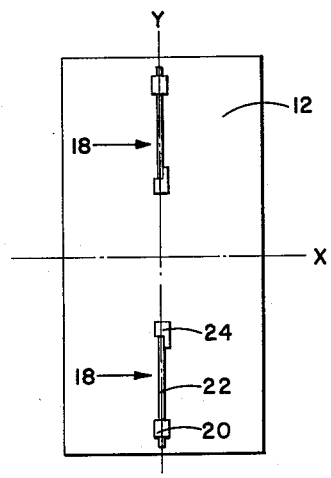
FIGURES 4a, 4b and 4c are schematic views showing the platform in various positions and the compensation devices respectively disposed for static balance of the platform in these positions.
Figure 4C:
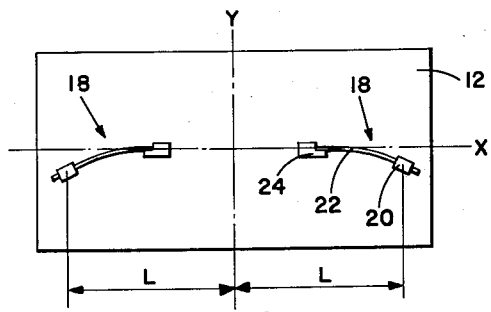
Figure 4B:
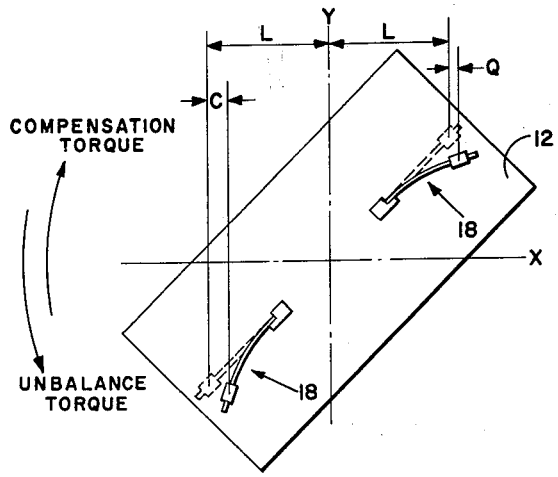

The compensation device 18 (FIGURES 2 and 3) is comprised of a slidable mass 20 carried by a cantilevered leaf spring 22 which is secured to mounting member 24 which in turn is mounted to an object, such as the platform 12 of simulator 10, to which the compensation torque is to be applied. The devices may be mounted on the platform so that the spring 22 is inwardly extending from mounting member 24 as shown in FIGURE 1 or outwardly extending as shown in FIGURES 4a, 4b and 4c.

Mass, or weight, 20 is provided with a set screw 26 to secure the mass in the desired position along the length of spring 22.

The compensation devices 18 are secured to the platform 12 so that one pair of the devices is parallel to one of the axes of the platform. Each of the devices which go to make up a single pair is mounted on the platform in a manner which will provide that each device is parallel to an axis and to the other compensation device of that particular pair and that the plane of the flat portion of the spring of each device is parallel one to the other.

The compensation devices 18 are further secured to the platform with sufficient clearance between the mass 20 and platform 12 to assure that there will be no contact between the mass 20 and platform 12 when spring 22 is deflected. It will be readily apperent that compensation may be accomplished by using one device for each axis; however, a pair of the devices used for each of the three axes makes it more simple to balance the platform and more easier to match the disturbing torque curve.

With compensation devices 18 mounted on platform 12, the platform 12 is then balanced in the horizontal and vertical planes. Since the balance of the platform will be affected when the weights (components to be tested) are placed thereon, the platform is provided with balancing means (not shown) to compensate for this unbalance; therefore, as the angular position of the platform 12 changes it will be seen that the lever arm for the weight (components to be tested) remains fixed; however, the lever arm for the compensation device is changed due to the deflection of the flat spring 22.

The disturbance caused in any axis by the compensation devices in the other two is neglegible due to the high width-to-thickness ratio of the flat springs.

The amplitude as well as the shape of the compensation torque curve may be changed by the angular placement (FIGURE 6) of the device (change of the tilt angle B of the undeflected leaf spring) in the plane of rotation, by the placement of the weight 20 along the flat spring 22 and by change of the spring constant.

Figure 6:
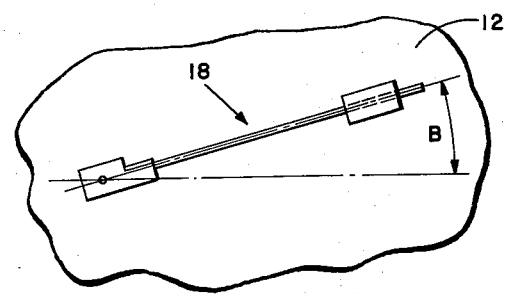
FIGURE 6 is a fragmentary view of the platform showing a compensation device mounted thereon and inclined to an axis.

The change of angular placement of the device is accomplished as shown in FIGURE 6. The compensation devices 18 may be secured to the platform so that instead of being parallel, they may be inclined to the axes of the platform. The angle of inclination is illustrated in FIGURE 6 as some arbitrary angle B.

In operation, the platform 12 is tilted to a predetermined angle and the unbalancing moment (due to unequal deflection inherent within the platform itself) exerts itself thereon.

Each of the compensation devices 18, being properly oriented with respect to the roll, pitch and yaw axes of the platform, move responsive to movement of the platform, in a direction opposing the torque imposed on the platform as a result of the unequal deflection.

FIGURES 4a, 4b and 4c are schematic diagrams of the platform 12. The platform 12 is free to pivot about its geometric center. FIGURES 4a and 4c show the platform balanced in the vertical and horizontal planes. FIGURE 4b illustrates the direction of an unbalancing moment which is produced when the platform is between the positions as illustrated in FIGURES 4a and 4c. The maximum moment to be compensated for occurs at approximately the 45° position.

With the compensation devices 18 mounted on the structure, it can then be balanced in the vertical position by shifting the mass 20 along the leaf spring 22 and then securing the mass 20 in the desired position. The platform is similarly balanced in the horizontal plane.

After the platform has been balanced in the vertical and horizontal planes it is then tilted and stabilized at a predetermined angle and the instruments carried by the platform are energized until the table is restored to and again stabilized in the horizontal plane. Data is thus obtained on the instruments as to their effectiveness in attitude control, speed of correction, cross-coupling effects, hunting, etc.

However, to be assured of an accurate evaluation of the instruments, it is necessary that the platform be rigid so that unequal deflection, due to the influence of gravity on the platform, be compensated for.

There is, of course, no truly "rigid" structure, and, therefore, due to the complexity of the simulator's floating structure, non-uniform bending at substantially all angular positions ocur to produce unequal deflection in the platform. This unequal deflection dislocates the center of gravity of the platform from a perpendicular through the center of rotation of the spherical air bearing and thus creates a disturbance torque which has detrimental effects on the performance of the Satellite Motion Simulator.

The principle of operation of the compensation device is that it produces a shift in the center of gravity of the platform which is opposite to the shift produced by the unequal deflection of the platform. This is achieved when the platform is tilted to the predetermined angle and stabilized in this position. The lever arm between the center of gravity of the platform and the weights of the compensation device is changed by deflection of the flat spring which produces a compensation moment opposite in direction to the unbalancing moment and achieves static balance of the platform while it is in the tilted position.

An example of how an unbalance force is compensated for, is illustrated in FIGURES 4a and 4b. Assume an unbalance force on the platform which moves the body from the position shown in FIGURE 4a to a position as indicated in FIGURE 4b wherein the dotted lines indicate the position of the weights with the springs undeflected which would occur when the platform is not subjected to bending, as illustrated in FIGURE 4a. The total compensation moment then, in first approximation, is indicated by $[(L+Q)-(L-C)]=Q+C$, where $L$=moment arm with compensation devices undeflected, and $Q$ and $C$ are changes of effective moment arms of the device.

It will be readily apparent from the foregoing example (using movement of the platform about one axis only for the sake of simplicity) that if the required compensation torque is known for any angular position of the platform then the net moment at any position of the platform could be made to approach zero and the effectiveness of the components being tested can be accurately determined.

While the compensation device described herein has been so described in its relationship to a satellite motion simulator it is to be understood that this has been for illustrative and not limiting purposes. The compensation device can be used on any other sensitive rotatable equipment (such as static balancing machines) wherein non-uniform bending under the influence of gravity creates undesirable torques.

I claim:

1. In a balancing device including a pedestal, a platform carried by said pedestal and disposed for substantially unrestricted movement about a set of intersecting perpendicular axes, said platform having a deflection torque imposed thereon as a result of inherent unequal bending of said platform during said movement, restoring means carried by said platform in biased relation thereto including a movable mass disposed to vary its distance from said axes to create a restoring torque equal in magnitude and opposite in direction to said deflection torque.

2. In a balancing device as in claim 1 wherein said restoring means is disposed on said platform in pairs and wherein each pair is positioned parallel to one of said axes.

3. In a balancing device as in claim 1 wherein said restoring means comprises a flat spring, a mounting member secured at one end of said spring and disposed for attachment to said platform, a body slidably mounted on said spring and disposed for selective attachment thereto.

4. In a balancing device including a pedestal, a platform carried by said pedestal and disposed for substantially unrestricted movement about a set of intersecting axes, said platform having a deflection torque imposed thereon as a result of inherent unequal bending of said platform during said movement, a plurality of torque compensation devices disposed on said platform in pairs, one of each pair disposed parallel to one of said axes, each of said compensation devices including a mounting member secured to said platform, a flat spring secured to said mounting member, a weight slidably attached to said spring for selective attachment thereto.

References Cited in the file of this patent

UNITED STATES PATENTS

| | | |
|---|---|---|
| 1,634,267 | Nagy | July 5, 1927 |
| 1,661,993 | Borda | Mar. 6, 1928 |